United States Patent
Li

(10) Patent No.: US 11,576,091 B2
(45) Date of Patent: Feb. 7, 2023

(54) HANDOVER METHOD

(71) Applicant: HUAWEI TECHNOLOGIES CO., LTD., Shenzhen (CN)

(72) Inventor: Guanchen Li, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/931,002

(22) Filed: May 13, 2020

(65) Prior Publication Data

US 2020/0275325 A1 Aug. 27, 2020

Related U.S. Application Data

(63) Continuation of application No. PCT/CN2017/110768, filed on Nov. 14, 2017.

(51) Int. Cl.
*H04W 36/00* (2009.01)
*H04W 76/15* (2018.01)
(Continued)

(52) U.S. Cl.
CPC ....... *H04W 36/0069* (2018.08); *H04L 5/0055* (2013.01); *H04W 36/08* (2013.01); *H04W 76/15* (2018.02); *H04W 76/27* (2018.02)

(58) Field of Classification Search
CPC . H04W 36/0069; H04W 76/15; H04W 76/27; H04W 36/08; H04L 5/0055
See application file for complete search history.

(56) References Cited

U.S. PATENT DOCUMENTS

| | | | |
|---|---|---|---|
| 2013/0259003 A1 | 10/2013 | Kwon et al. | |
| 2015/0208283 A1* | 7/2015 | Yang | H04L 47/34 370/331 |

(Continued)

FOREIGN PATENT DOCUMENTS

| | | |
|---|---|---|
| CN | 101689922 A | 3/2010 |
| CN | 102938912 A | 2/2013 |

(Continued)

OTHER PUBLICATIONS

ZTE Corporation,"Signalling flows of solution 1 A",3GPP TSG-RAN3 Meeting #82 R3-132204,San Francisco, CA, USA, Nov. 11-15, 2013,Total 7 Pages.

(Continued)

*Primary Examiner* — Chi H Pham
*Assistant Examiner* — Ji-Hae Yea
(74) *Attorney, Agent, or Firm* — Hauptman Ham, LLP

(57) ABSTRACT

A handover method includes receiving, by a target master base station, a handover request from a source master base station. The handover request is useable to request handover of a user equipment from the source master base station to the target master base station. The method further includes sending, by the target master base station, a handover request acknowledgment message to the source master base station based on the handover request, establishing, by the target master base station, a communication connection to the user equipment, and adding, by the target master base station, a secondary base station for the user equipment. The handover request acknowledgment message indicates that the target master base station allows the user equipment to be handed over from the source master base station to the target master base station.

11 Claims, 7 Drawing Sheets

(51) Int. Cl.
    *H04W 76/27*     (2018.01)
    *H04L 5/00*     (2006.01)
    *H04W 36/08*     (2009.01)

(56) References Cited

U.S. PATENT DOCUMENTS

| | | | |
|---|---|---|---|
| 2016/0227459 A1* | 8/2016 | Fujishiro | H04W 36/0069 |
| 2016/0337925 A1 | 11/2016 | Fujishiro et al. | |
| 2016/0373972 A1* | 12/2016 | Vesely | H04W 36/0033 |
| 2017/0055187 A1 | 2/2017 | Kang et al. | |

FOREIGN PATENT DOCUMENTS

| | | | |
|---|---|---|---|
| CN | 104168630 A | 11/2014 | |
| CN | 104301955 A | 1/2015 | |
| CN | 104509161 A | 4/2015 | |
| CN | 104581843 A | 4/2015 | |
| CN | 104822169 A | 8/2015 | |
| CN | 105981442 A | 9/2016 | |
| CN | 106134253 A | 11/2016 | |
| CN | 106162765 A | 11/2016 | |
| CN | 107113670 A | 8/2017 | |
| CN | 107113671 A | 8/2017 | |
| EP | 2863681 A1 | 4/2015 | |
| WO | 2015136888 A1 | 9/2015 | |
| WO | 2016114623 A1 | 7/2016 | |

OTHER PUBLICATIONS

Samsung,"Basic Singalling flow and mobility Scenarios in Dual Connectivity",3GPP TSG-RAN WG3 #83 R3-140143, Prague, Czech Republic, Feb. 10-14, 2014,Total 3 Pages.

Chinese Office Action issued in corresponding Chinese Application No. 201780096141, dated Sep. 24, 2020, pp. 1-9, The State Intellectual Property Office of People's Republic of China, Beijing, China.

European Search Report issued in corresponding European Application No. 17932268.0, dated Sep. 29, 2020, pp. 1-13, European Patent Office, Munich, Germany.

Chinese Office Action issued in corresponding Chinese Application No. 201780096141.X, dated Apr. 14, 2021, pp. 1-6.

3GPP TS 36.300 V14.4.0 (Sep. 2017);3rd Generation Partnership Project;Technical Specification Group Radio Access Network;Evolved Universal Terrestrial Radio Access (E-UTRA) and Evolved Universal Terrestrial Radio Access Network (E-UTRAN);Overall description;Stage 2(Release 14);total 329 pages.

International Search Report issued in corresponding International Application No. PCT/CN2017/110768, dated May 2, 2018, State Intellectual Property Office of the P.R. China, Beijing, China.

Chinese Office Action issued in corresponding Chinese Application No. 201780096141.X, dated Jan. 26, 2022, pp. 1-8.

\* cited by examiner

HANDOVER METHOD

CROSS-REFERENCE TO RELATED APPLICATIONS

This application is a continuation of International Patent Application No. PCT/CN2017/110768, filed on Nov. 14, 2017, the disclosure of which is hereby incorporated by reference in its entirety.

TECHNICAL FIELD

This application relates to the communications field, and in particular, to a handover method and a device.

BACKGROUND

Dual connectivity (DC) is introduced in the 3rd generation partnership project (3GPP) protocol, in other words, user equipment (UE) is allowed to use two base stations at the same time to perform data transmission, including one master base station and one secondary base station.

A procedure of handover between master base stations is defined in the 3GPP. When the UE is handed over from a source master base station to a target master base station, for example, when the UE gradually moves away from a coverage of the source master base station and gradually enters a coverage of the target master base station, the UE may be handed over from the source master base station to the target master base station. In a process of handover between master base stations, the source master base station first sends a handover request to the target master base station, then the target master base station sends an addition request to the secondary base station, to request to add the secondary base station. After waiting for and receiving an addition request reply sent by the secondary base station, the target master base station sends a handover request reply to the source master base station. Then, the source master base station sends a release request to the secondary base station, where the release request is used to instruct the secondary base station to release a connection related to the UE between the source master base station and the secondary base station, and then sends a radio resource control (RRC) connection reconfiguration message to the UE. The UE obtains, based on the RRC connection reconfiguration message, handover information of handover from the source master base station to the target master base station and configuration information of the secondary base station, is handed over from the source master base station to the target master base station, and adds the secondary base station.

Therefore, when the UE is handed over from the source master base station to the target master base station, after sending the handover request to the target master base station, the source master base station waits for the target master base station to add the secondary base station, and then the UE can be handed over between the master base stations, however the waiting duration is excessively long. If the UE is in a high-speed moving state, and if the waiting duration is excessively long, the UE may be out of the coverage of the target master base station. Thus, the UE cannot be handed over to the target master base station, resulting in a handover failure.

SUMMARY

Embodiments of this application provide a handover method, a base station, user equipment, and a computer storage medium, to reduce a procedure of performing handover of the UE between master base stations, shorten duration of performing handover of the UE between master base stations, and improve a success rate of performing handover of the UE between master base stations in a fast-moving scenario.

In view of this, according to a first aspect of the embodiments of this application, a handover method is provided. The method may include:

a target master base station receives a handover request sent by a source master base station, where the handover request is used to request to hand over user equipment from the source master base station to the target master base station; after determining that the user equipment can be handed over to the target master base station, the target master base station does not need to add a secondary base station for the user equipment, generates a handover request acknowledgment message based on the handover request, and sends the handover request acknowledgment message to the source master base station, to notify the source master base station that the target master base station allows the user equipment to be handed over from the source master base station to the target master base station; and then the target master base station establishes a communication connection to the user equipment, and adds the secondary base station for the user equipment after the communication connection is established.

In this embodiment of this application, after receiving the handover request sent by the source master base station, the target master base station learns that the source master base station requests to hand over the user equipment from the source master base station to the target master base station. In this case, the target master base station does not need to add the secondary base station for the user equipment, directly generates the handover request acknowledgment message, sends the handover request acknowledgment message to the source master base station, to notify the source master base station that the target master base station allows the user equipment to be handed over to the target master base station, and adds the secondary base station for the user equipment only after the communication connection to the user equipment is established. This can reduce a procedure of performing handover of the user equipment between master base stations, shorten duration of performing handover of the user equipment between master base stations, and improve a success rate of performing handover of the user equipment between master base stations when the user equipment moves at a high speed.

With reference to the first aspect of the embodiments of this application, in a first implementation of the first aspect of the embodiments of this application, that the target master base station adds the secondary base station for the user equipment may include:

the target master base station sends an addition request to the secondary base station, and then receives addition acknowledgment information sent by the secondary base station; the target master base station obtains, by using the addition acknowledgment information, that the secondary base station allows the target master base station to add the secondary base station; and the target master base station sends configuration information of the secondary base station to the user equipment, so that the user equipment accesses the secondary base station based on the configuration information.

In this embodiment of this application, after establishing the communication connection to the user equipment, the target master base station adds the secondary base station for the user equipment. The target master base station may first send the addition request to the secondary base station. After receiving addition acknowledgment information sent by the secondary base station, the target master base station adds the secondary base station for the user equipment, and the user equipment re-accesses the secondary base station. This provides a specific manner in which the target master base station adds the secondary base station for the user equipment.

With reference to the first implementation of the first aspect of the embodiments of this application, in a second implementation of the first aspect of the embodiments of this application, that the target master base station sends the configuration information of the secondary base station to the user equipment may include:

the target master base station sends an RRC connection reconfiguration message to the user equipment, where the RRC connection reconfiguration message includes the configuration information of the secondary base station, and the user equipment can access the secondary base station based on the configuration information.

In this embodiment of this application, the target master base station sends, by using the RRC connection reconfiguration message, the configuration information of the secondary base station to the source master base station, so that the user equipment can access the secondary base station based on the configuration information.

According to a second aspect of the embodiments of this application, a handover method is provided. The method may include:

after determining that user equipment is to be handed over to a target master base station, a source master base station sends a handover request to the target master base station, to request to hand over the user equipment from the source master base station to the target master base station; before the target master base station adds a secondary base station for the user equipment, the source master base station receives a handover request acknowledgment message sent by the target master base station; and the source master base station obtains, by using the handover request acknowledgment message, that the target master base station allows the user equipment to be handed over to the target master base station, and then the source master base station instructs to hand over the user equipment to the target master base station, so that the user equipment establishes a communication connection to the target master base station.

In this embodiment of this application, after determining that the user equipment is to be handed over to the target master base station, the source master base station sends a handover request to the target master base station, to request to hand over the user equipment to the target master base station. Before the target master base station adds the secondary base station for the user equipment, the source master base station receives the handover request acknowledgment message sent by the target master base station, and obtains, by using the handover request acknowledgment message, that the target master base station allows the user equipment to be handed over to the target master base station. The target master base station sends the handover request acknowledgment message before adding the secondary base station for the user equipment, and does not need to add the secondary base station for the user equipment before sending the handover request acknowledgment message. This reduces a handover procedure of the user equipment, may shorten duration of performing handover of the user equipment between master base stations, and may improve a success rate of performing handover of the user equipment between master base stations.

With reference to the second aspect of the embodiments of this application, in a first implementation of the second aspect of the embodiments of this application, that the source master base station instructs to hand over the user equipment to the target master base station may include:

the source master base station sends an RRC connection reconfiguration message to the user equipment, where the RRC connection reconfiguration message includes handover information of handover of the user equipment from the source master base station to the target master base station, so that the user equipment is handed over from the source master base station to the target master base station based on the handover information. This is one of manners in which the source master base station instructs to hand over the user equipment to the target master base station.

With reference to the second aspect of the embodiments of this application or the first implementation of the second aspect of the embodiments of this application, in a second implementation of the second aspect of the embodiments of this application, after the source master base station instructs to hand over the user equipment to the target master base station, the source master base station sends a release request to the secondary base station, where the release request is used to instruct to release a connection related to the user equipment between the source master base station and the secondary base station.

According to a third aspect of the embodiments of this application, a handover method is provided. The method may include:

user equipment receives notification information sent by a source master base station, where the notification information includes handover information of handover of the user equipment from the source master base station to a target master base station, the notification information is sent after the source master base station receives a handover request acknowledgment message sent by the target master base station, the handover request acknowledgment message is sent before the target master base station adds a secondary base station for the user equipment, and the handover request acknowledgment message is used to indicate that the target master base station allows the user equipment to be handed over from the source master base station to the target master base station; and the user equipment establishes a communication connection to the target master base station based on the notification information.

In this embodiment of this application, before adding the secondary base station for the user equipment, the target master base station sends the handover request acknowledgment message to the source master base station. This reduces a procedure of adding the secondary base station when the user equipment is handed over between master base stations, may shorten duration of performing handover of the user equipment between master base stations, and may improve a success rate of performing handover of the user equipment between master base stations.

With reference to the third aspect of the embodiments of this application, in a first implementation of the third aspect of the embodiments of this application, after the user equipment establishes the connection to the target master base station based on the notification information, the user equipment receives a second RRC connection reconfiguration message sent by the target master base station, where the second RRC connection reconfiguration message includes configuration information of the secondary base station, and the user equipment accesses the secondary base station based on the configuration information.

In this embodiment of this application, only after establishing the communication connection to the target master base station, the user equipment accesses the secondary base station, and the secondary base station does not need to be added when the user equipment is handed over between master base stations. This reduces a procedure of adding the secondary base station when the user equipment is handed over between master base stations, may shorten a procedure of performing handover of the user equipment between master base stations, and improve a success rate of performing handover of the user equipment between master base stations.

With reference to the third aspect of the embodiments of this application or the first implementation of the third aspect of the embodiments of this application, in a second implementation of the embodiments of this application, that the user equipment establishes the connection to the target master base station based on the notification information may include:

the user equipment receives a first RRC connection reconfiguration message sent by the source master base station, where the first RRC connection reconfiguration message includes handover information of handover to the target master base station; and the user equipment accesses the target master base station based on the handover information, and establishes the communication connection to the target master base station.

According to a fourth aspect of the embodiments of this application, a base station is provided. The base station has a function of implementing the target master base station in the handover method according to any one of the first aspect or the implementations of the first aspect. The function may be implemented by hardware, or may be implemented by hardware executing corresponding software. The hardware or the software includes one or more modules corresponding to the foregoing function.

According to a fifth aspect of the embodiments of this application, a base station is provided. The base station has a function of implementing the source master base station in the handover method according to any one of the second aspect or the implementations of the second aspect. The function may be implemented by hardware, or may be implemented by hardware executing corresponding software. The hardware or the software includes one or more modules corresponding to the foregoing function.

According to a sixth aspect of the embodiments of this application, user equipment is provided. The user equipment has a function of implementing the user equipment in the handover method according to any one of the third aspect or the implementations of the third aspect. The function may be implemented by hardware, or may be implemented by hardware executing corresponding software. The hardware or the software includes one or more modules corresponding to the foregoing function.

According to a seventh aspect of the embodiments of this application, a base station is provided. The base station may include:

a processor, a memory, a bus, and an input/output interface, where the processor, the memory, and the input/output interface are connected by using the bus; where the memory is configured to store program code; and when invoking the program code in the memory, the processor performs the steps performed by the target master base station according to any one of the first aspect of this application or the implementations of the first aspect.

According to a eighth aspect of the embodiments of this application, a base station is provided. The base station may include:

a processor, a memory, a bus, and an input/output interface, where the processor, the memory, and the input/output interface are connected by using the bus; where the memory is configured to store program code; and when invoking the program code in the memory, the processor performs the steps performed by the source master base station according to any one of the second aspect of this application or the implementations of the second aspect.

According to an ninth aspect of the embodiments of this application, user equipment is provided. The user equipment may include:

a processor, a memory, a bus, and an input/output interface, where the processor, the memory, and the input/output interface are connected by using the bus; where the memory is configured to store program code; and when invoking the program code in the memory, the processor performs the steps performed by the user equipment according to any one of the third aspect of this application or the implementations of the third aspect.

According to a tenth aspect of the embodiments of this application, a communications system is provided. The communications system includes a target master base station and a source master base station, where the target master base station is the target master base station that performs any implementation in the first aspect to the third aspect of this application, the source master base station is the source master base station that performs any implementation in the first aspect to the third aspect of this application, and the user equipment is the user equipment that performs any implementation in the first aspect to the third aspect of this application.

According to a eleventh aspect of the embodiments of this application, a storage medium is provided. It should be noted that the technical solutions of this application essentially, or the part contributing to the prior art, or all or some of the technical solutions may be implemented in a form of a software product. The software product is stored in a storage medium, and is configured to store a computer software instruction used by the foregoing device. The computer software product includes a program designed for the target master base station, the source master base station, or the user equipment to perform any one of the first aspect to the third aspect.

The storage medium includes any medium that can store program code, such as a USB flash drive, a removable hard disk, a read-only memory (English acronym: ROM, English full name: Read-Only Memory), a random access memory (English acronym: RAM, English full name: Random Access Memory), a magnetic disk, or an optical disc.

According to an twelfth aspect of the embodiments of this application, a computer program product including an instruction is provided. When the computer program product is run on a computer, the computer is enabled to perform the method according to any one of the first aspect of this application or the optional implementations of the first aspect.

According to a thirteenth aspect of the embodiments of this application, a computer program product including an instruction is provided. When the computer program product is run on a computer, the computer is enabled to perform the method according to any one of the second aspect of this application or the optional implementations of the second aspect.

According to a fourteenth aspect of the embodiments of this application, a computer program product including an instruction is provided. When the computer program product is run on a computer, the computer is enabled to perform the method according to any one of the third aspect of this application or the optional implementations of the third aspect.

According to a fifteenth aspect of this application, a communications apparatus is provided. The communications apparatus includes a processing element and a storage element, where the storage element is configured to store a program, and when the program is invoked by the processing element, the communications apparatus is configured to perform the method according to any one of the first aspect or the implementations of the first aspect.

According to a sixteenth aspect of this application, a communications apparatus is provided. The communications apparatus includes a processing element and a storage element, where the storage element is configured to store a program, and when the program is invoked by the processing element, the communications apparatus is configured to perform the method according to any one of the second aspect or the implementations of the second aspect.

According to a seventeenth aspect of this application, a communications apparatus is provided. The communications apparatus includes a processing element and a storage element, where the storage element is configured to store a program, and when the program is invoked by the processing element, the communications apparatus is configured to perform the method according to any one of the third aspect or the implementations of the third aspect.

In the technical solutions provided in the embodiments of this application, after receiving the handover request sent by the source master base station and learning that the UE is to be handed over from the source master base station to the target master base station, the target master base station directly replies to the handover request, allows the UE to be handed over from the source master base station to the target master base station, and then directly establishes the connection to the UE, thereby reducing a delay of adding the secondary base station by the target master base station.

DESCRIPTION OF EMBODIMENTS

To make a person skilled in the art understand the solutions in the present disclosure better, the following describes several embodiments in more detail with reference to the accompanying drawings and implementations. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure. The following describes the technical solutions in embodiments of this application with reference to the accompanying drawings in the embodiments of this application.

Figure 1:
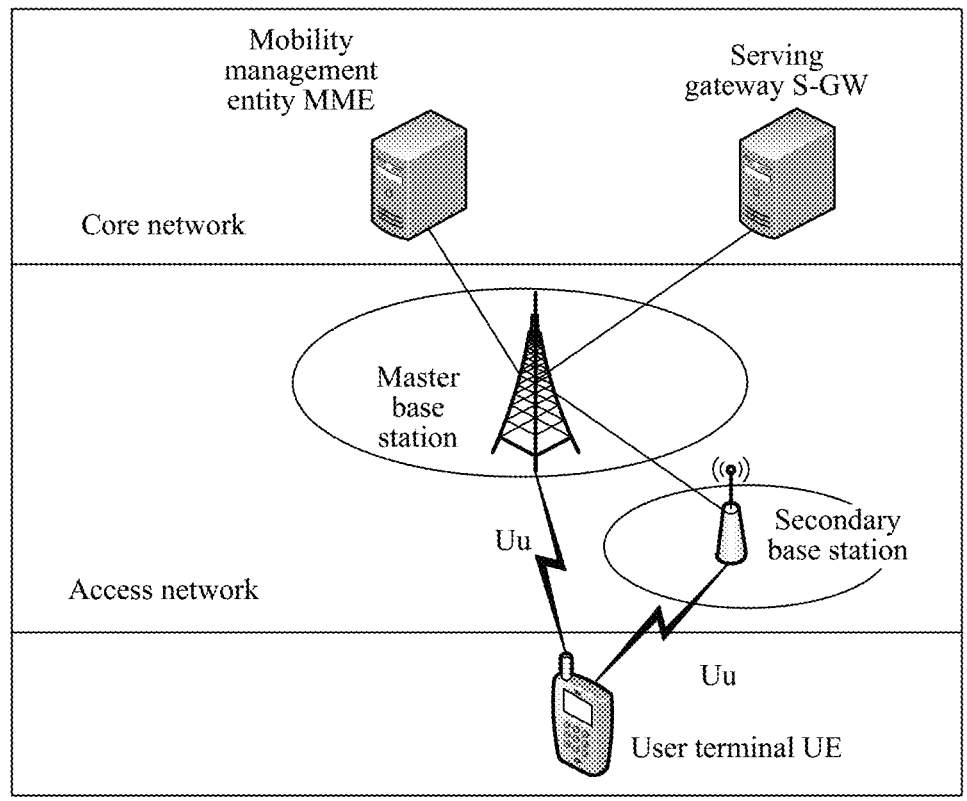
FIG. 1 is a schematic diagram of a network architecture according to at least an embodiment of this application.

FIG. 1 is a schematic diagram of a network architecture according to an embodiment of this application.

In a network architecture to which embodiments of this application are applied, UE may be connected to at least two base stations. An access network may include an evolved universal terrestrial radio access network (E-UTRAN) in a long term evolution (LTE) system, a non-standalone (NSA) in an LTE-new radio (LTE-NR), or an access network of a system, except the LTE system, in which the UE may be connected to at least two base stations and may use the at least two base stations to perform data transmission. A mobility management entity (MME) and a serving gateway (S-GW) are network elements in a core network, the MME and the S-GW separately establish a connection to a master base station in the access network, and the master base station is used as a mobility anchor of the core network. A connection is established between the master base station and a secondary base station, and the secondary base station may perform data transmission with the UE. A radio Uu interface is established both between the UE and the master base station and between the UE and the secondary base station. The interface may be used to transmit data sent and received by the UE, in other words, the UE may perform data transmission by using the master base station and the secondary base station, so that a data throughput of the network is improved, and communication efficiency of the UE is improved. The embodiments of this application provide a method of quick handover between master base stations, a base station, and UE, so that the UE can be quickly handed over from a source master base station to a target master base station. When the UE moves at a high speed and crosses a coverage of the master base stations, the UE can be quickly handed over between the master base stations, so that a success rate of performing handover of the UE between master base stations is improved.

It should be noted that the technical solutions provided in this application may be applied to a Long Term Evolution (LTE) system, or other wireless communications systems that use various radio access technologies, for example, systems that use access technologies such as code division multiple access, frequency division multiple access, time division multiple access, orthogonal frequency division multiple access, and single carrier frequency division multiple access. In addition, the technical solutions may alternatively be applied to a subsequent evolved system of the LTE system, for example, a 5th generation 5G system. This is not specifically limited herein.

Figure 2:
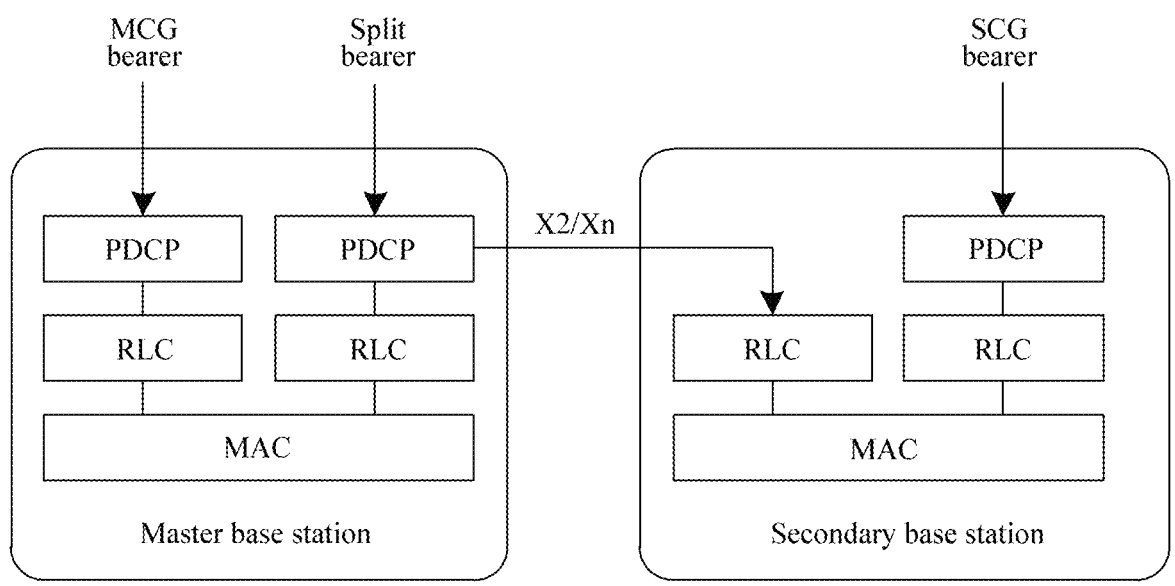
FIG. 2 is a schematic diagram of data transmission and a protocol stack according to at least an embodiment of this application.

The E-UTRAN in the LTE or the NSA in the LTE-NR is used as an example. FIG. 2 shows one type of data transmission and a protocol stack in the network architecture shown in FIG. 1. A protocol stack of a master cell group (MCG) bearer is located only in the master base station, in other words, the bearer uses only the master base station to perform data transmission. A protocol stack of a split bearer (Split bearer) is located in the master base station and the secondary base station, in other words, the bearer may use both the master base station and the secondary base station to perform data transmission. A protocol stack of a secondary cell group bearer (SCG bearer) is located only in the secondary base station, in other words, the bearer uses only the secondary base station to perform data transmission. The split bearer configures a packet data convergence protocol (PDCP) entity in the master base station and two radio link control (RLC) entities that are respectively located in the master base station and the secondary base station. The split bearer further includes medium access control (MAC) entities that are respectively located in the master base station and the secondary base station and physical layers (PHY) that are respectively located in the master base station and the secondary base station. An example of downlink data is as follows: The PDCP in the master base station sends some PDCP protocol data units (PDU) to the RLC entity in the secondary base station by using an X2 or Xn interface (where the X2 interface is in the E-UTRAN in the LTE, and the Xn interface is in the NSA in the LTE-NR). Then, the RLC entity in the secondary base station performs next sending, and sends some other PDCP protocol data units to the RLC entity in the master base station, and then the RLC entity in the master base station performs next sending. If the MCG bearer is used, a PDCP in the master base station directly delivers a PDU to an RLC entity, and then the RLC entity in the master base station performs next sending. If the SCG bearer is used, a PDCP in the secondary base station directly delivers a PDU to an RLC entity, and then the RLC entity in the secondary base station performs next sending.

In the E-UTRAN in the LTE, the master base station may be a master evolved NodeB) MeNB, and the secondary base station may be a secondary evolved NodeB (SeNB). Similarly, in the NSA in the LTE-NR, the master base station may be a master gNodeB (MgNB), and the secondary base station may be a secondary gNodeB (SgNB).

Figure 3:
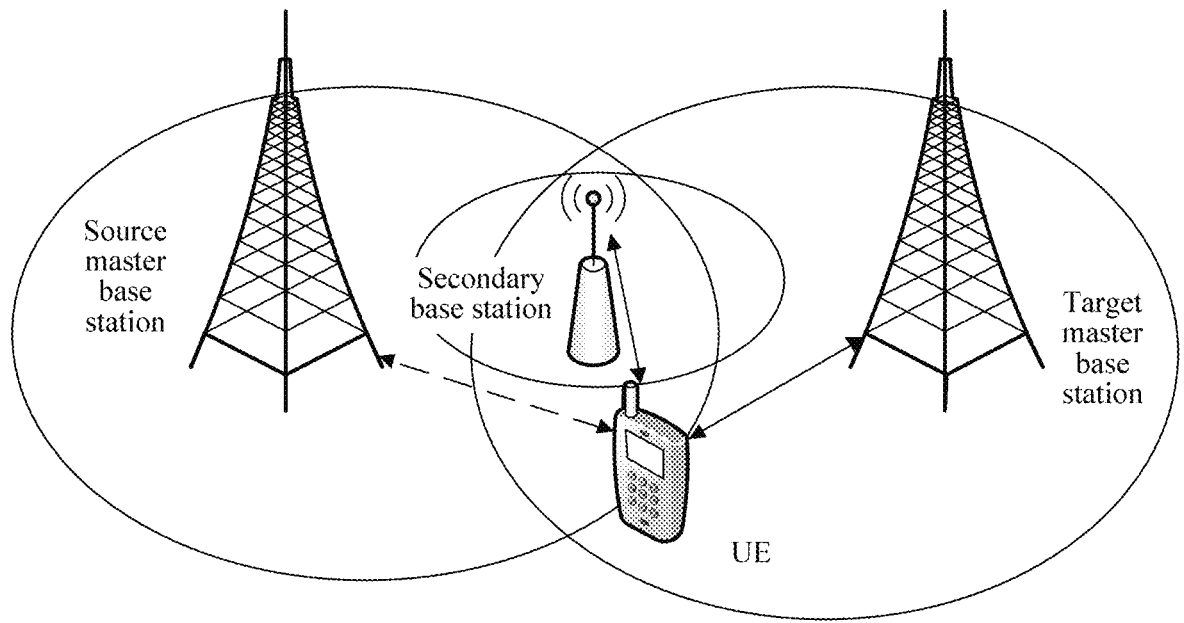
FIG. 3 is a schematic diagram of an application scenario according to at least an embodiment of this application.

FIG. 3 is a schematic diagram of an application scenario according to an embodiment of this application. UE establishes a communication connection to both a source master base station and a secondary base station, and performs data transmission by using the source master base station and the secondary base station. In actual application, if the UE moves from a coverage of the source master base station to a coverage of a target master base station, signal strength of a target signal, of the target master base station, received by the UE becomes stronger, and signal strength of a source signal, of the source master base station, received by the UE becomes weaker. When the signal strength of the target signal is higher than a threshold or the signal strength of the source signal is lower than a threshold, or when the source master base station is to be disabled, handover between master base stations may be initiated by the UE, or handover between master base stations may be initiated by the source master base station after the source master base station detects that the UE moves. This is not specifically limited herein. It should be noted that the source master base station and the target master base station in this embodiment of this application may be an MeNB in an E-UTRAN of the LTE, or may be an MgNB in the LTE-NR, or may be another master base station in a system including a DC scenario. This is not specifically limited herein. The secondary base station may be an SeNB in the E-UTRAN of the LTE, or may be an SgNB in the LTE-NR, or may be another secondary base station in a system including a DC scenario. This is not specifically limited herein.

Figure 4:
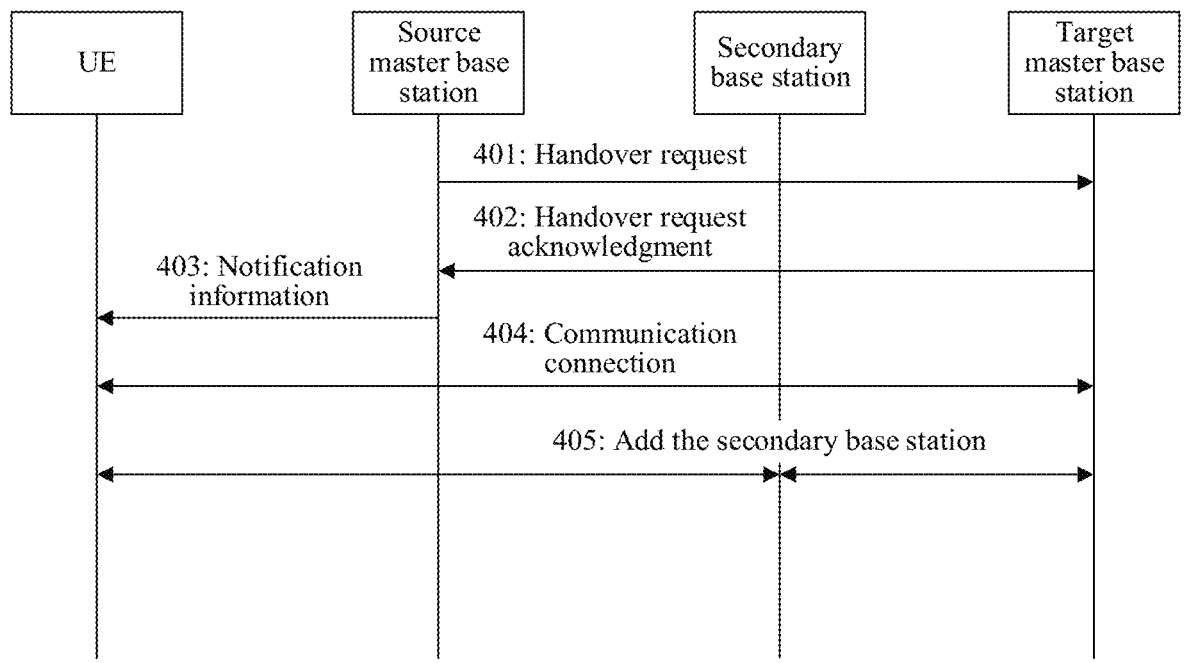
FIG. 4 is a schematic diagram of an embodiment of a handover method according to at least an embodiment of this application.

FIG. 4 is a schematic diagram of an embodiment of a handover method according to an embodiment of this application. The method includes the following steps.

401: A source master base station sends a handover request to a target master base station.

UE is currently attached to the source master base station. After the source master base station detects that the UE moves from a coverage of the source master base station to a coverage of the target master base station, after the source master base station detects that signal strength of the target master base station is higher than a threshold or higher than signal strength of the source master base station, or after the UE detects that signal strength of the target master base station is higher than a threshold or higher than signal strength of the source master base station and sends a measurement report to the source master base station, the source master base station sends the handover request to the target master base station, and the target master base station obtains, by using the handover request, that the source master base station requests to hand over the UE to the target master base station.

402: The target master base station sends a handover request acknowledgment message to the source master base station.

After the target master base station receives the handover request of the source master base station and determines that the UE can be handed over to the target master base station, the target master base station sends the handover request acknowledgment message to the source master base station, where the handover request acknowledgment message is used to notify the source master base station that the target master base station allows the UE to be handed over to the target master base station. After receiving the handover request of the source master base station, the target master base station does not need to directly add a secondary base station of the UE, and directly sends the handover request acknowledgment message to the source master base station. This reduces a procedure of adding the secondary base station for the UE by the target master base station, and can shorten duration of establishing a communication connection between the target master base station and the UE.

403: The source master base station sends notification information to the UE.

After the source master base station determines that the target master base station allows the UE to be handed over to the target master base station, the source master base station notifies the UE that the UE can be handed over to the target master base station. The UE receives the notification information sent by the source master base station, and obtains, by using the notification information, handover information of handover from the source master base station to the target master base station.

404: The UE establishes a communication connection to the target master base station.

Before the target master base station adds the secondary base station for the UE, the UE accesses the target master base station based on the handover information in the notification information, establishes the communication connection to the target master base station, and may perform data transmission by using the target master base station. In this embodiment of this application, after receiving the handover request sent by the source master base station, the target master base station determines that the UE can be handed over to the target master base station. The target master base station does not need to add the secondary base station for the UE, and directly sends the handover request acknowledgment message to the source master base station, to notify the source master base station that the target master base station allows the UE to be handed over to the target master base station. The source master base station instructs to hand over the UE to the target master base station, and then, the UE establishes the communication connection to the target master base station. When the UE is handed over between master base stations, the procedure of adding the secondary base station by the target master base station is reduced, the duration of performing handover of the UE between master base stations can be shortened, and a success rate of performing handover of the UE between master base stations can be improved.

405: The target master base station adds the secondary base station for the UE.

After the UE is successfully handed over from the source master base station to the target master base station, the target master base station adds the secondary base station for the UE, the UE accesses the secondary base station, the target master base station establishes a communication connection related to the UE to the secondary base station, and the UE may use the master base station and the secondary base station to perform data transmission, so that a data throughput of a network is improved and improving data transmission efficiency of the UE is improved.

In this embodiment of this application, after receiving the handover request sent by the source master base station, the target master base station learns that the source master base station requests to hand over the UE to the target master base station, and after determining that the UE can be handed over to the target master base station, the target master base station sends handover reply information to the source master base station before adding the secondary base station for the UE, to notify the source master base station that the target master base station allows the UE to be handed over to the target master base station, and then establishes the communication connection to the UE. This reduces a procedure of performing handover of the UE from the source master base station to the target master base station, shortens duration of performing handover of the UE from the source master base station to the target master base station, and improves a success rate of performing handover of the UE between master base stations when the UE moves at a high speed. After the UE is successfully handed over from the source master base station to the target master base station, the secondary base station is added for the UE, so that the UE can perform data transmission by using the master base station and the secondary base station, and this improves data transmission efficiency and improves a success rate of performing handover of the UE between master base stations in a fast-moving scenario.

Specifically, in daily application, Xiao Ming holds a mobile phone, and drives through a cell A from a cell B when Xiao Ming returns home from work. A moving speed is 100 kilometers per hour, and when the mobile phone is in the cell B, base stations to which the mobile phone is connected are a master base station C and a secondary base station D, the secondary base station D is located between the cell B and the cell A, and a coverage of the master base station C is the cell B. When Xiao Ming quickly moves from the cell B to the cell A, signal strength of a signal, of the master base station C, received by the mobile phone becomes weaker, signal strength of a signal, of a master base station E, received by the mobile phone becomes stronger, and a coverage of the master base station E is the cell A. In this case, the master base station C detects that signal strength of the mobile phone changes, and initiates a handover request to the master base station E, to request to hand over the mobile phone from the master base station C to the master base station E. After receiving the handover request sent by the master base station C, the master base station E determines that the mobile phone can be handed over to the master base station E, does not need to add the secondary base station, and directly sends a handover request acknowledgment message to the master base station C, to notify the master base station C that the master base station E allows the mobile phone to be handed over to the master base station E. The master base station C instructs to hand over the mobile phone, and sends handover information of handover to the master base station E to the mobile phone. The mobile phone establishes a communication connection to the master base station E based on the handover information, and the mobile phone can be quickly handed over to the master base station E. The master base station E does not need to establish the connection to the mobile phone after adding the secondary base station D. If the mobile phone is in a high-speed moving state, the mobile phone may be quickly handed over from the master base station C to the master base station E when the mobile phone is in the coverage of the master base station E. After the master base station E successfully establishes the communication connection to the mobile phone, the master base station E learns that a secondary base station of the mobile phone is the secondary base station D, and then the master base station E adds the secondary base station D for the mobile phone, so that the mobile phone can perform data transmission by using the master base station E and the secondary base station D, and communication efficiency of the mobile phone is improved.

Figure 5:
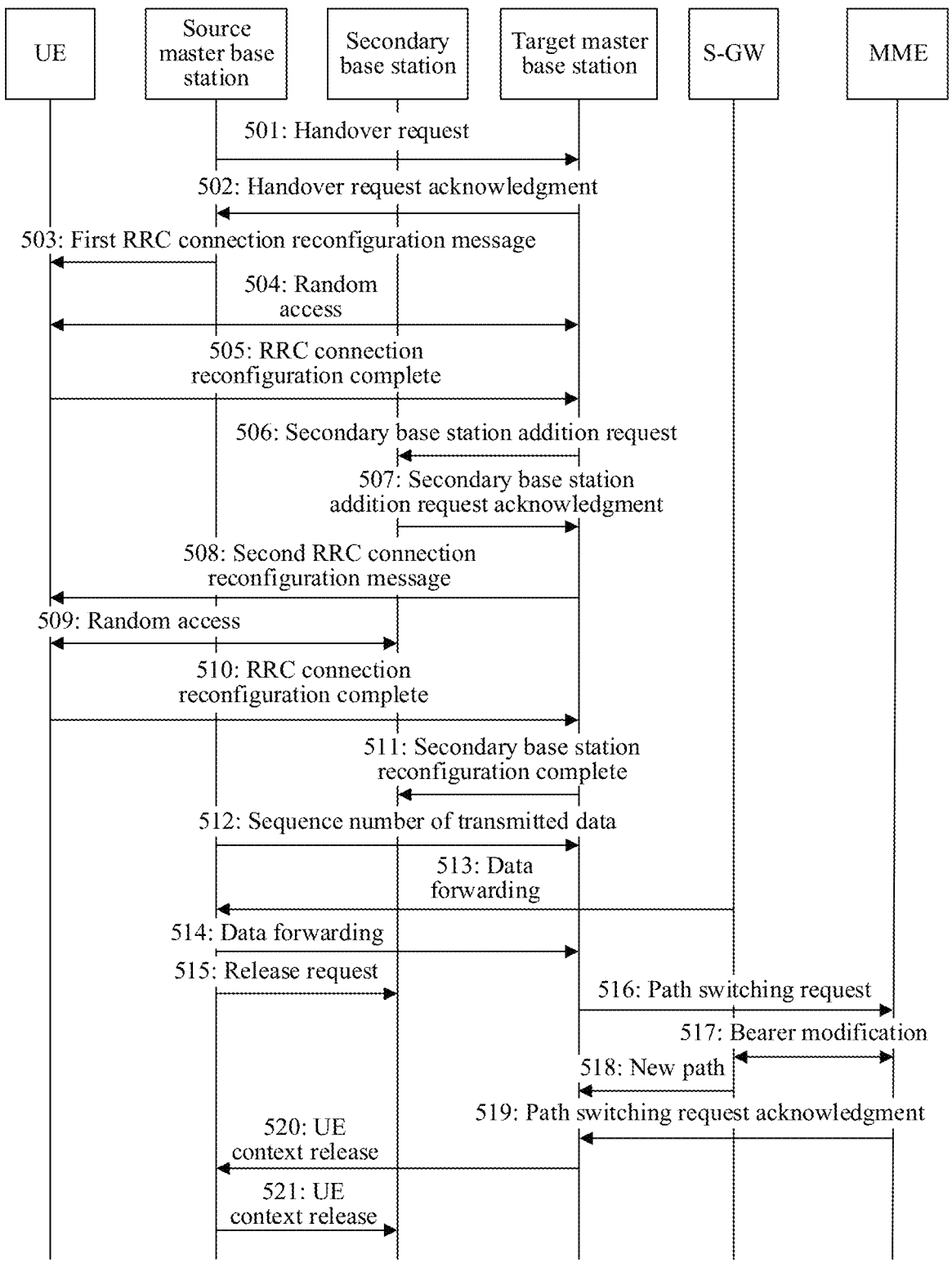
FIG. 5 is a schematic diagram of another embodiment of a handover method according to at least an embodiment of this application.

The foregoing describes the method provided in the embodiments of this application. The following further describes the method provided in the embodiments of this application. It should be noted that the source master base station and the target master base station in the embodiments of this application may be an MeNB in an E-UTRAN in the LTE, may be an MgNB in the LTE-NR, or may be another master base station in a system, except the LTE, including a DC scenario. This is not specifically limited herein. The secondary base station may be an SeNB in the E-UTRAN in the LTE, may be an SgNB in the LTE-NR, or may be a secondary base station in a system, except the LTE, including a DC scenario. This is not specifically limited herein. FIG. 5 is a schematic diagram of another embodiment of a handover method according to an embodiment of this application. The method includes the following steps:

501: A source master base station sends a handover request to a target master base station.

When UE moves from a coverage of the source master base station to a coverage of the target master base station, the source master base station is to be disabled, the UE attached to the source master base station is handed over, or the like, after the source master base station receives a request to hand over the UE to the target master base station, detects that the UE moves to the coverage of the target master base station, determines, in different ways, that the UE is to be handed over to the target master base station, or the like, the source master base station sends a handover request to the target master base station, to request to hand over the UE from the source master base station to the target master base station. For example, a user A drives at this moment, and a mobile phone B used by the user A is also in a vehicle at this moment and moves with the vehicle. If a master base station to which the mobile phone B is connected at this moment is a base station C, and as the vehicle moves, the mobile phone B also moves with the vehicle and moves from a coverage of the base station C to a coverage of a base station D, the mobile phone B or the base station C may initiate, to the base station D, a request to hand over the mobile phone B from the base station C to the base station D. For another example, if the mobile phone B of the user A is in a coverage of both the base station C and the base station D, and a master base station to which the mobile phone B is connected is the base station C, because the base station C has a high coverage repetition rate with the base station D and the base station C has low utilization, the base station C is to be temporarily disabled, and therefore, the mobile phone B is to be handed over from the base station C to the base station D, and the base station C initiates a request to the base station D.

502: The target master base station sends a handover request acknowledgment message to the source master base station.

After receiving the handover request sent by the source master base station and learning that the source master base station requests to hand over the UE to the target master base station or that the UE requests to be handed over from the source master base station to the target master base station, the target master base station does not need to add a secondary base station for the UE, and may directly generate acknowledgment information, where the acknowledgment information includes that the target master base station allows the UE to be handed over from the source master base station to the target master base station. The target master base station sends a handover request acknowledgment message including the acknowledgment information to the source master base station, to notify the source master base station that the target master base station allows the UE to be handed over from the source master base station to the target master base station. In this embodiment of this application, after receiving the handover request sent by the source master base station and before the target master base station adds the secondary base station for the UE, the target master base station sends the handover request acknowledgment message to the source master base station. This reduces a procedure of adding the secondary base station when the UE is handed over between master base stations, and can shorten duration of performing handover of the UE between master base stations.

503: The source master base station sends a first RRC connection reconfiguration message to the UE.

After receiving the handover request acknowledgment message sent by the target master base station, the source master base station determines that the UE can be handed over from the source master base station to the target master base station, and sends the first RRC connection reconfiguration message to the UE, to instruct to hand over the UE to the target master base station. The first RRC connection reconfiguration message includes handover configuration information of handover of the UE from the source master base station to the target master base station.

504: The UE randomly accesses the target master base station.

The UE receives the first RRC connection reconfiguration message sent by the source master base station, obtains the handover configuration information of handover from the source master base station to the target master base station, and randomly accesses the target master base station based on the handover configuration information.

505: The UE sends an RRC connection reconfiguration complete message to the target master base station.

After accessing the target master base station, the UE may further send the RRC connection reconfiguration complete message to the target master base station, to notify the target master base station that RRC connection reconfiguration is complete.

506: The target master base station sends a secondary base station addition request to the secondary base station.

After receiving the RRC connection reconfiguration complete message sent by the UE and determining that the UE has accessed the target master base station, the target master base station obtains the secondary base station of the UE, and sends the secondary base station addition request to the secondary base station, to request the secondary base station to add the secondary base station for the UE.

In this embodiment of this application, only after the target master base station establishes a communication connection to the UE, in other words, after the UE is successfully handed over from the source master station to the target master base station, the target master base station adds the secondary base station for the UE, and the target master base station does not need to add the secondary base station when the UE establishes the communication connection to the target master base station. This reduces a procedure of adding the secondary base station for the UE, may shorten duration of performing handover of the UE between master base stations, and may improve a success rate of performing handover of the UE between master base stations when the UE moves at a high speed.

507: The secondary base station sends a secondary base station addition request acknowledgment message to the target master base station.

After the secondary base station receives the secondary base station addition request sent by the target master base station and learns that the target master base station requests to add the secondary base station for the UE, the secondary base station sends the secondary base station addition request acknowledgment message to the target master base station, to allow the target master base station to add the secondary base station for the UE.

508: The target master base station sends a second RRC connection reconfiguration message to the UE.

After determining that the secondary base station may be added for the UE, the target master base station sends the second RRC connection reconfiguration message to the UE. The second RRC connection reconfiguration message includes configuration information of the secondary base station.

509: The UE randomly accesses the secondary base station.

After receiving the second RRC connection reconfiguration message sent by the target master base station, the UE obtains the configuration information of the secondary base station based on the second RRC connection reconfiguration message, and accesses the secondary base station based on the configuration information. It should be understood that, when the UE is handed over between master base stations, a link between the UE and the secondary base station may be disconnected or may not be disconnected, and if the link between the UE and the secondary base station is not disconnected, the UE may re-access the secondary base station based on the configuration information.

510: The UE sends an RRC connection reconfiguration complete message to the target master base station.

After successfully accessing the secondary base station, the UE sends the RRC connection reconfiguration complete message to the target master base station, to notify the target master base station that the UE has accessed the secondary base station.

511: The target master base station sends a secondary base station reconfiguration complete message to the secondary base station.

After determining that the UE has accessed the secondary base station, the target master base station may further send the secondary base station reconfiguration complete message to the secondary base station, to determine that the target master base station has successfully added the secondary base station for the UE.

512: The source master base station sends a sequence number of transmitted data to the target master base station.

If the source master base station transmits data when the UE is handed over between master base stations, where the transmitting data includes that some data has been transmitted and remaining data has not been completely transmitted, the source master base station may send a PDCP sequence number of the data that has been transmitted to the target master base station, so that the target master base station learns the sequence number of the data that has been transmitted, thereby preventing data loss. For example, when the UE is handed over between master base stations, the source master base station performs data transmission of a split bearer or an MCG bearer. After the UE is handed over to the target master base station, one third of data transmitted by the source master base station has been transmitted. Therefore, the source master base station sends, to the target master base station, a PDCP sequence number and a transmission status of the one third of data that has been transmitted, so that the target master base station learns of the transmission status of the one third of data.

513: An S-GW performs data forwarding with the source master base station.

When learning that the UE is handed over between master base stations when the UE performs data transmission, the S-GW sends, to the source master base station, data that has been transmitted by the source master base station, and then the source master base station sends the data to the target master base station.

514: The source master base station and the target master base station perform data forwarding.

After the S-GW sends, to the source master base station, the data that has been transmitted by the source master base station, the source master base station sends the data to the target master base station. For example, the source master base station has transmitted one third of data, so that the S-GW sends the one third of data to the source master base station, and then, the source master base station sends the one third of data to the target master base station, to maintain integrity of the transmitted data, and to prevent data loss when the UE is handed over between master base stations.

515: The source master base station sends a release request to the secondary base station.

The source master base station sends the release request to the secondary base station, where the release request is used to instruct the secondary base station to delete a connection related to the UE to the source master base station and retain a UE context, and the secondary base station can continue to use the UE context.

It should be noted that in this embodiment of this application, step 515 may be performed before or after any step after step 505. This is not limited herein.

516: The target master base station sends a path switching request to an MME.

The target master base station sends the path switching request to the MME, to request the MME to change a path of the master base station of the UE.

517: The MME and the S-GW perform bearer modification.

The MME and the S-GW modify the split bearer or the MCG bearer of the target master base station, including re-establishing a split bearer or an MCG bearer on the target master base station.

518: The S-GW sends a new path message to the target master base station.

After determining the split bearer or the MCG bearer of the target master base station, the S-GW and the MME notify the target master base station of the split bearer or the MCG bearer.

519: The MME sends a path switching request acknowledgment message to the target master base station.

The MME sends the path switching request acknowledgment message to the target master base station, to acknowledge a new path to be switched to.

520: The target master base station sends a UE context release message to the source master base station.

After determining that the new path is established, in other words, the split bearer or the MCG bearer is established, the target master base station sends the UE context release message to the source master base station, so that the source master base station releases the UE context.

521: The source master base station sends the UE context release message to the secondary base station.

After releasing the UE context, the source master base station notifies the secondary base station that the source master base station has released the UE context. The secondary base station may continue to use the UE context to perform data transmission that has not been completed, and data transmission performed when the UE is handed over may continue to be performed.

It should be noted that, in this embodiment of this application, steps 512 to 521 are optional steps.

In this embodiment of this application, after the target master base station receives the handover request sent by the source master base station, where the handover request is to request to hand over the UE from the source master base station to the target master base station, the target master base station sends the handover request acknowledgment message to the source master base station, to acknowledge that the target master base station allows the UE to be handed over from the source master base station to the target master base station. Only after the UE is handed over from the source master base station to the target master base station, the target master base station adds the secondary base station for the UE, and sends the configuration information of the secondary base station to the UE, so that the UE accesses the secondary base station. If the UE is in a moving state, after receiving the handover request of the source master base station, the target master base station directly replies to the handover request, and the target master base station adds the secondary base station for the UE only after the UE is handed over from the source master base station to the target master base station. The UE does not need to establish a communication connection to the target master base station after the target master base station adds the secondary base station. This reduces a procedure of performing handover of the UE between master base stations, and shortens duration of performing handover of the UE between master base stations.

Specifically, a mobile phone B of a user A is in a moving state, and moves from a coverage of a master base station C to a coverage of a master base station D. In this case, after the mobile phone B sends a handover request to the master base station C, or when the master base station C detects that strength of a signal, of the master base station D, received by the mobile phone B is higher than a threshold, the master base station C sends the handover request to the master base station D, to request to hand over the UE from the master base station C to the master base station D. After receiving the handover request sent by the master base station C, the master base station D learns that the master base station C requests to hand over the UE to the master base station D. In this case, the master base station D does not need to add a secondary base station E for the mobile phone B, so that a procedure of adding the secondary base station for the mobile phone B is reduced. The master base station D directly sends a handover request acknowledgment message to the master base station C, to notify the master base station C that the master base station D allows the UE to be handed over to the master base station D. The master base station C adds handover information of handover of the UE to the master base station D to an RRC connection reconfiguration message, and sends the RRC connection reconfiguration message to the UE. The UE may access the master base station D based on the handover information, and establish a communication connection to the master base station D. This reduces a procedure of handover of the mobile phone B from the master base station C to the master base station D, reduces handover duration, and improving a success rate of handover of the mobile phone B from the master base station C to the master base station D. After determining that the communication connection to the mobile phone B is established, the master base station D learns that the mobile phone B corresponds to the secondary base station E, and sends an addition request to the secondary base station E, to request to add the secondary base station E for the mobile phone B. After receiving an addition request acknowledgment message of the secondary base station E, the master base station D establishes a communication connection related to the mobile phone B to the secondary base station E, then sends an RRC connection reconfiguration message to the mobile phone B, where the RRC connection reconfiguration message includes configuration information of the secondary base station E, and the mobile phone B may access the secondary base station E based on the configuration information. In this way, the mobile phone B may perform data transmission by using the master base station D and the secondary base station E, thereby increasing a data transmission amount of the mobile phone B. In addition, after the master base station D adds the secondary base station E, the master base station C may send a secondary base station release request to the secondary base station E, and the secondary base station E may release, based on the secondary base station release request, the connection related to the mobile phone B to the master base station C, and retain a context of the mobile phone B, to prevent a loss of data transmitted during handover. When the mobile phone B is handed over between master base stations, the master base station D adds the secondary base station E for the mobile phone B only after successfully establishing the communication connection to the mobile phone B, so that a procedure of handover of the mobile phone B between master base stations can be reduced, and duration of handover of the mobile phone B between master base stations when the mobile phone B moves at a high speed can be shortened.

Figure 6:
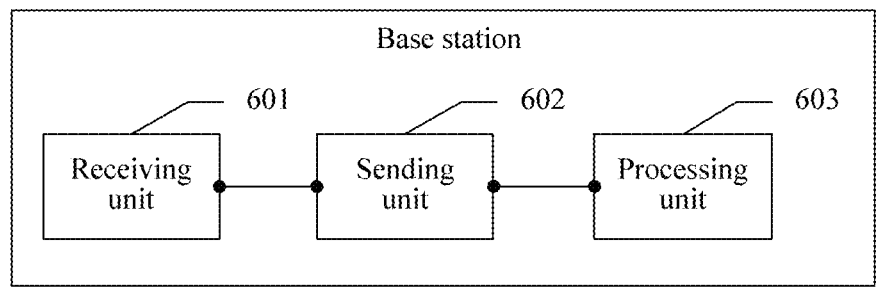
FIG. 6 is a schematic diagram of an embodiment of a base station according to at least an embodiment of this application.

The foregoing describes in detail the handover method in the embodiments of this application. The following describes an apparatus part in the embodiments of this application. FIG. 6 is a schematic diagram of an embodiment of a base station according to an embodiment of this application. The base station includes:

a receiving unit 601, configured to receive a handover request sent by a source master base station, where the handover request is used to request to hand over user equipment from the source master base station to a target master base station;

a sending unit 602, configured to send a handover request acknowledgment message to the source master base station based on the handover request, where the handover request acknowledgment message is used to indicate that the target master base station allows the user equipment to be handed over from the source master base station to the target master base station; and a processing unit 603, configured to establish a communication connection to the user equipment, where the processing unit 603 is further configured to add a secondary base station for the user equipment.

In some embodiments, the sending unit 602 is further configured to send an addition request to the secondary base station;

the receiving unit 601 is further configured to receive addition acknowledgment information sent by the secondary base station, where the addition acknowledgment information is used to indicate that the target master base station is allowed to add the secondary base station; and the sending unit 602 is further configured to send configuration information of the secondary base station to the user equipment, so that the user equipment accesses the secondary base station based on the configuration information.

In some embodiments, the sending unit 602 is specifically configured to send a radio resource control RRC connection reconfiguration message to the user equipment, where the RRC connection reconfiguration message includes the configuration information of the secondary base station, and the connection reconfiguration message is used to instruct the user equipment to access the secondary base station based on the configuration information.

Figure 7:
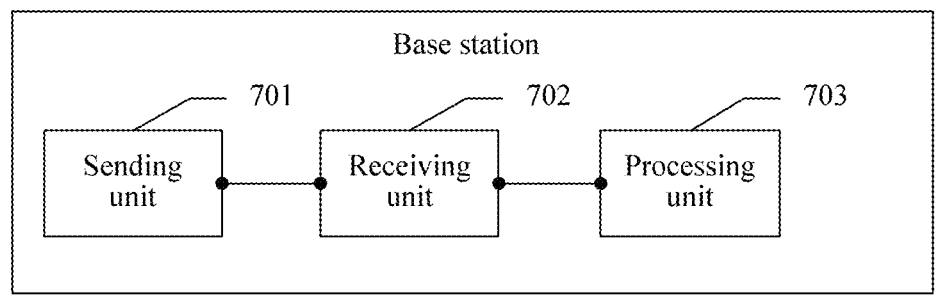
FIG. 7 is a schematic diagram of another embodiment of a base station according to at least an embodiment of this application.

FIG. 7 is a schematic diagram of another embodiment of a base station according to an embodiment of this application. The base station includes:

a sending unit 701, configured to send a handover request to a target master base station, where the handover request is used to request to hand over user equipment from a source master base station to the target master base station;

a receiving unit 702, configured to receive a handover request acknowledgment message sent by the target master base station, where the handover request acknowledgment message is sent before the target master base station adds a secondary base station for the user equipment, and the handover request acknowledgment message is used to indicate that the target master base station allows the user equipment to be handed over from the source master base station to the target master base station; and a processing unit 703, configured to instruct to hand over the user equipment to the target master base station, so that the user equipment establishes a communication connection to the target master base station.

In some embodiments, the processing unit 703 is specifically configured to send an RRC connection reconfiguration message to the user equipment, where the RRC connection reconfiguration message includes handover information of handover of the user equipment from the source master base station to the target master base station, so that the user equipment is handed over from the source master base station to the target master base station based on the handover information.

In some embodiments, the sending unit 701 is further configured to send a release request to the secondary base station, where the release request is used to instruct to release a connection related to the user equipment between the source master base station and the secondary base station.

Figure 8:
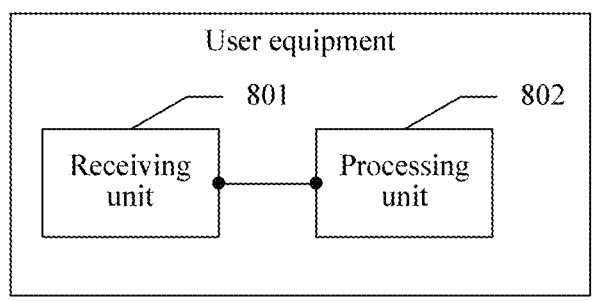
FIG. 8 is a schematic diagram of an embodiment of user equipment according to at least an embodiment of this application.

FIG. 8 is a schematic diagram of an embodiment of user equipment according to an embodiment of this application. The user equipment includes:

a receiving unit 801, configured to receive notification information sent by a source master base station, where the notification information includes handover information of handover of the user equipment from the source master base station to a target master base station, the notification information is sent after the source master base station receives a handover request acknowledgment message sent by the target master base station, the handover request acknowledgment message is sent before the target master base station adds a secondary base station for the user equipment, and the handover request acknowledgment message is used to indicate that the target master base station allows the user equipment to be handed over from the source master base station to the target master base station; and a processing unit 802, configured to establish a communication connection to the target master base station based on the notification information.

In some embodiments, the receiving unit 801 is further configured to: after the processing unit 802 establishes the connection to the target master base station based on the notification information, receive a second RRC connection reconfiguration message sent by the target master base station, where the second RRC connection reconfiguration message includes configuration information of the secondary base station; and the processing unit 802 is further configured to access the secondary base station based on the configuration information in the second RRC connection reconfiguration message received by the receiving unit 801.

In some embodiments, the receiving unit 801 is further configured to receive a first RRC connection reconfiguration message sent by the source master base station, where the first RRC connection reconfiguration message includes the handover information; and the processing unit 802 is further configured to establish the connection to the target master base station based on the handover information in the first RRC connection reconfiguration message received by the receiving unit 801.

Figure 9:
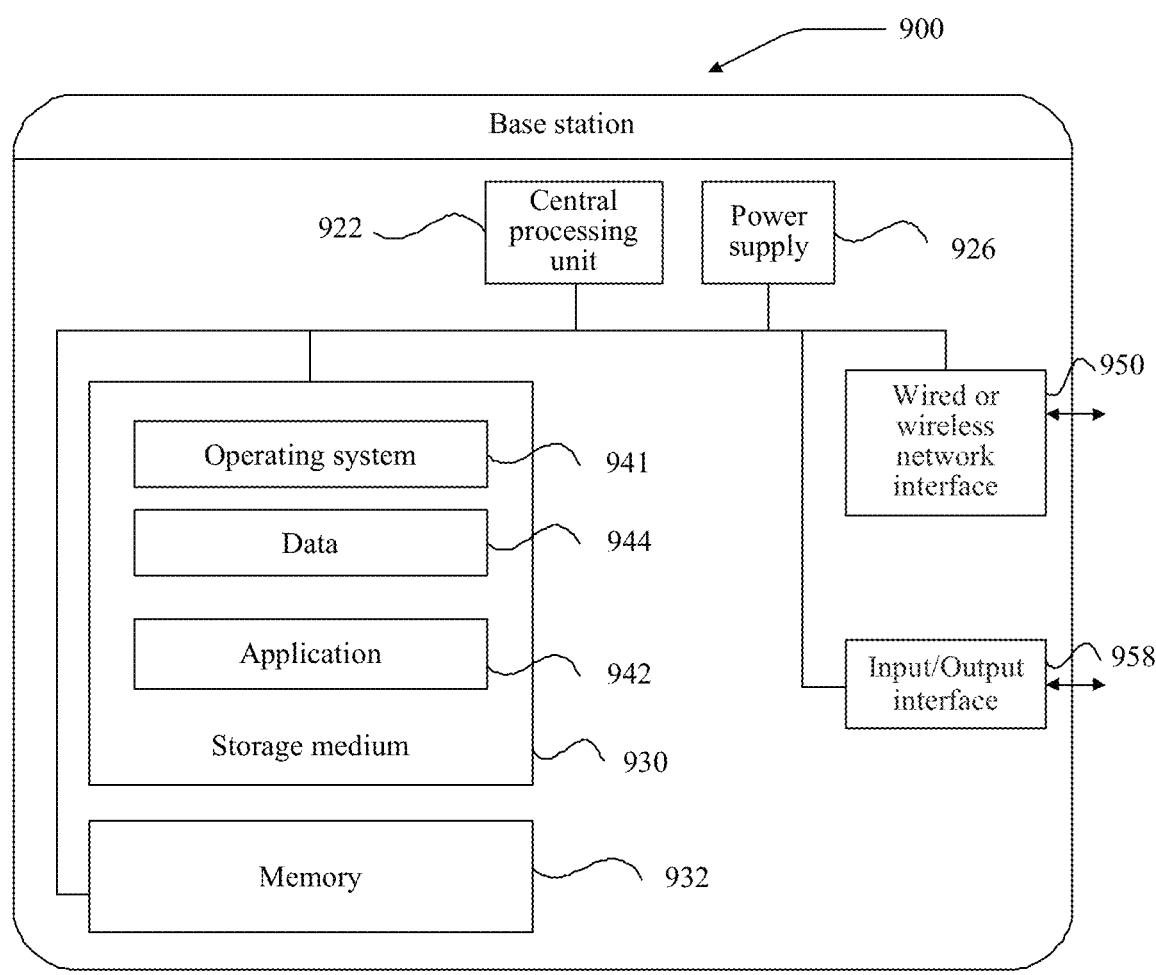
FIG. 9 is a schematic diagram of another embodiment of a base station according to at least an embodiment of this application.

FIG. 9 is a schematic diagram of another embodiment of a base station according to an embodiment of this application. The base station 900 may have a relatively large difference due to different configuration or performance, and may include one or more central processing units (central processing units, CPU) 922 (for example, one or more processors), a memory 932, and one or more storage media 930 (for example, one or more mass storage devices) that store an application program 942 or data 944. The memory 932 and the storage medium 930 may be used for temporary storage or permanent storage. The program stored in the storage medium 930 may include one or more modules (not shown in the figure), and each module may include a series of instruction operations for the base station. Further, the central processing unit 922 may be configured to communicate with the storage medium 930, to perform, on the base station 900, the series of instruction operations in the storage medium 930.

The base station 900 may further include one or more power supplies 926, one or more wired or wireless network interfaces 950, one or more input/output interfaces 958, and/or one or more operating systems 941 such as Windows Server™, Mac OS X™, Unix™, Linux™, and FreeBSD™.

The steps performed by the base station in the foregoing embodiments may be based on the base station structure shown in FIG. 9.

Figure 10:
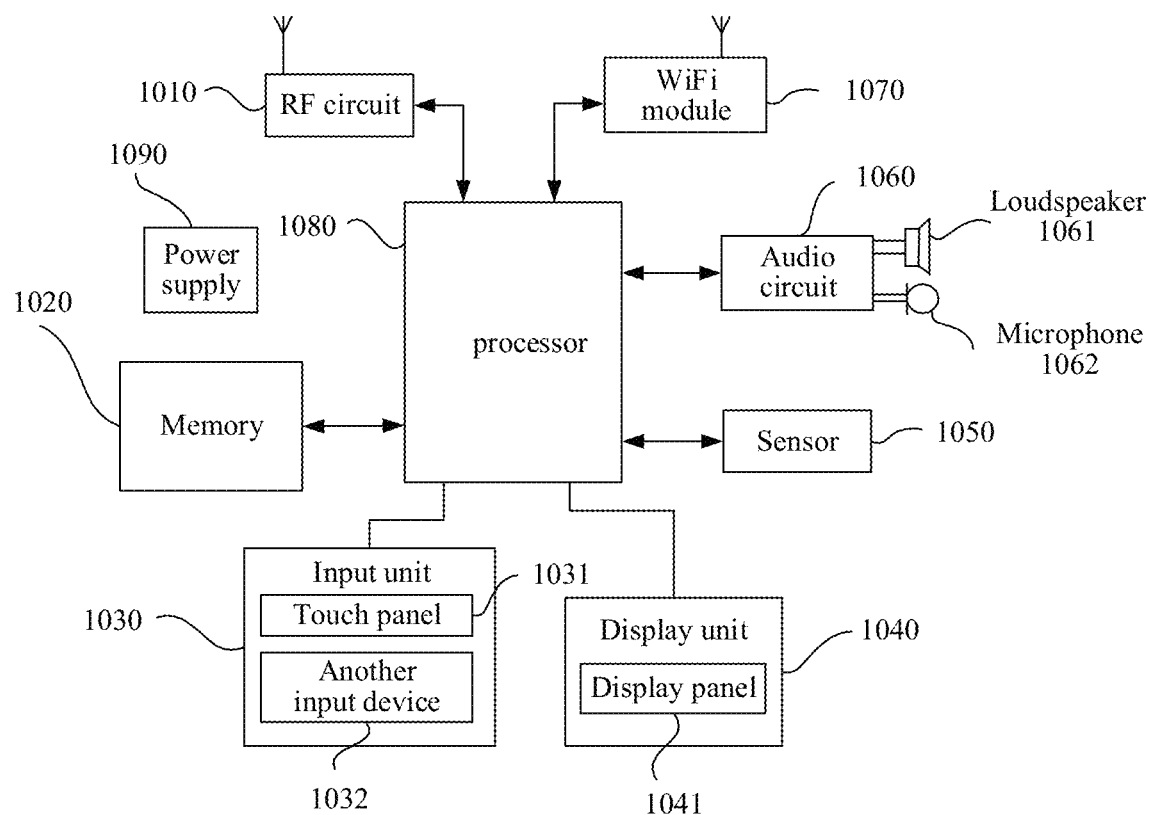
FIG. 10 is a schematic diagram of another embodiment of user equipment according to at least an embodiment of this application.

As shown in FIG. 10, an embodiment of this application further provides another user equipment. For ease of description, only a part related to this embodiment of this application is described. For specific technical details that are not disclosed, refer to the method part in the embodiments of this application. The user equipment may be any terminal device such as a mobile phone, a tablet computer, a PDA (Personal Digital Assistant, personal digital assistant), a POS (Point of Sales, point of sales), or a vehicle-mounted computer. The following specifically describes the user equipment in this embodiment of this application.

FIG. 10 is a block diagram of a part of a structure of user equipment according to an embodiment of this application. Referring to FIG. 10, the user equipment includes components such as a radio frequency (Radio Frequency, RF) circuit 1010, a memory 1020, an input unit 1030, a display unit 1040, a sensor 1050, an audio circuit 1060, a wireless fidelity (wireless fidelity, WiFi) module 1070, a processor 1080, and a power supply 1090. A person skilled in the art may understand that the user equipment structure shown in FIG. 10 does not constitute any limitation on the user equipment. The user equipment may include more or fewer components than those shown in the figure, or combine some components, or have a different component arrangement.

The following describes each component of the user equipment in detail with reference to FIG. 10.

The RF circuit 1010 may be configured to receive and send a signal in an information receiving and sending process or a call process. In particular, the RF circuit 1010 receives downlink information from a base station, and then sends the downlink information to the processor 1080 for processing. In addition, the RF circuit 1010 sends designed uplink data to the base station. Usually, the RF circuit 1010 includes but is not limited to an antenna, at least one amplifier, a transceiver, a coupler, a low noise amplifier (Low Noise Amplifier, LNA), a duplexer, and the like. In addition, the RF circuit 1010 may further communicate with a network and another device through wireless communication. Any communications standard or protocol may be used in the wireless communication, including but not limited to a global system for mobile communications (Global System of Mobile communication, GSM), a general packet radio service (General Packet Radio Service, GPRS), code division multiple access (Code Division Multiple Access, CDMA), wideband code division multiple access (Wideband Code Division Multiple Access, WCDMA), long term evolution (Long Term Evolution, LTE), an email, a short message service (Short Messaging Service, SMS), and the like.

The memory 1020 may be configured to store a software program and a module. The processor 1080 runs the software program and the module stored in the memory 1020, to perform various function applications of the user equipment and perform data processing. The memory 1020 may mainly include a program storage area and a data storage area. The program storage area may store an operating system, an application program that is used by at least one function (such as a sound playing function or an image playing function), and the like. The data storage area may store data (such as audio frequency data or a phone book) created based on use of the user equipment, and the like. In addition, the memory 1020 may include a high speed random access memory, and may further include a nonvolatile memory, for example, at least one magnetic disk storage device, a flash memory device, or another volatile solid-state storage device.

The input unit 1030 may be configured to receive input numeral or character information, and generate key signal input related to user setting and function control that are of the user equipment. Specifically, the input unit 1030 may include a touch panel 1031 and another input device 1032. The touch panel 1031, also referred to as a touchscreen, may collect a touch operation performed by the user on or near the touch panel 1031 (for example, an operation performed by a user on or near the touch panel 1031 by using any proper object or accessory such as a finger or a stylus), and drive a corresponding connection apparatus based on a preset program. In some embodiments, the touch panel 1031 may include two parts: a touch detection apparatus and a touch controller. The touch detection apparatus detects a touch direction of the user, detects a signal brought by the touch operation, and transmits the signal to the touch controller. The touch controller receives touch information from the touch detection apparatus, converts the touch information into touch coordinates, then sends the touch coordinates to the processor 1080, and can receive and execute a command sent by the processor 1080. In addition, the touch panel 1031 may be implemented in a plurality of types, such as a resistive type, a capacitive type, an infrared type, and a surface acoustic wave type. The input unit 1030 may include the another input device 1032 in addition to the touch panel 1031. Specifically, the another input device 1032 may include but is not limited to one or more of a physical keyboard, a function key (for example, a volume control key or an on/off key), a trackball, a mouse, a joystick, and the like.

The display unit 1040 may be configured to display information input by the user or information provided for the user, and various menus of the user equipment. The display unit 1040 may include a display panel 1041. In some embodiments, the display panel 1041 may be configured in a form of a liquid crystal display (Liquid Crystal Display, LCD), an organic light-emitting diode (Organic Light-Emitting Diode, OLED), or the like. Further, the touch panel 1031 may cover the display panel 1041. After detecting the touch operation on or near the touch panel 1031, the touch panel 1031 transmits the touch operation to the processor 1080 to determine a type of a touch event, and then the processor 1080 provides corresponding visual output on the display panel 1041 based on the type of the touch event. In FIG. 10, the touch panel 1031 and the display panel 1041 are used as two independent components to implement input and input functions of the user equipment. However, in some embodiments, the touch panel 1031 and the display panel 1041 may be integrated to implement the input and output functions of the user equipment.

The user equipment may further include at least one sensor 1050, such as an optical sensor, a motion sensor, and another sensor. Specifically, the optical sensor may include an ambient light sensor and a proximity sensor. The ambient light sensor may adjust luminance of the display panel 1041 based on brightness of ambient light. The proximity sensor may turn off the display panel 1041 and/or backlight when the user equipment is moved to an ear. As one type of motion sensor, an accelerometer sensor may detect a magnitude of acceleration in directions (generally, three axes), may detect a magnitude and a direction of gravity when the user equipment is static, and may be used for an application identifying a posture of the user equipment (such as screen switching between landscape and portrait modes, a related game, or magnetometer posture calibration), a vibration identification-related function (such as a pedometer or tapping), or the like. For another sensor that can be configured in the user equipment, such as a gyroscope, a barometer, a hygrometer, a thermometer, or an infrared sensor, details are not described herein.

The audio frequency circuit 1060, a loudspeaker 1061, and a microphone 1062 can provide an audio interface between the user and the user equipment. The audio circuit 1060 may convert received audio data into an electrical signal, and transmit the electrical signal to the loudspeaker 1061, and the loudspeaker 1061 converts the electrical signal into a sound signal for output. On the other hand, the microphone 1062 converts a collected sound signal into an electrical signal. The audio circuit 1060 receives the electrical signal, converts the electrical signal into audio data, and then outputs the audio data to the processor 1080 for processing. The processor 1080 sends the audio data to, for example, another user equipment by using the RF circuit 1010, or outputs the audio data to the memory 1020 for further processing.

Wi-Fi is a short distance wireless transmission technology. The user equipment may help, by using the Wi-Fi module 1070, the user receive and send emails, browse a web page, access streaming media, and the like, to provide wireless broadband internet access for the user. Although FIG. 10 shows the Wi-Fi module 1070, it may be understood that the Wi-Fi module 1070 is not a mandatory part of the user equipment, and may be omitted without changing the essence of this application.

As a control center of the user equipment, the processor 1080 is connected to various parts of the entire user equipment by using various interfaces and lines, and performs various functions and/or data processing of the user equipment by running or executing a software program and/or a module stored in the memory 1020 and invoking data stored in the memory 1020, to perform integral monitoring on the user equipment. In some embodiments, the processor 1080 may include one or more processing units. Preferably, an application processor and a modem processor may be integrated into the processor 1080. The application processor mainly processes an operating system, a user interface, an application program, and the like. The modem processor mainly processes wireless communication. It may be understood that the modem processor may alternatively not be integrated into the processor 1080.

The user equipment also includes the power supply 1090 (such as a battery) that supplies power to all components. Preferably, the power supply may be logically connected to the processor 1080 by using a power supply management system, to implement functions such as charging and discharging management and power consumption management by using the power supply management system.

Although not shown in the figure, the user equipment may further include a camera, a bluetooth module, and the like, and details are not described herein.

In this embodiment of this application, the processor 1080 included in the user equipment further has the following functions:

receiving notification information sent by a source master base station, obtaining, based on the notification information, handover information of handover to a target master base station, then establishing a communication connection to the target master base station by using the RF circuit 1010, then receiving an RRC connection reconfiguration message that is sent by the target master base station and that includes configuration information of a secondary base station, and accessing, based on the configuration information, the secondary base station by using the RF circuit 1010.

Figure 11:
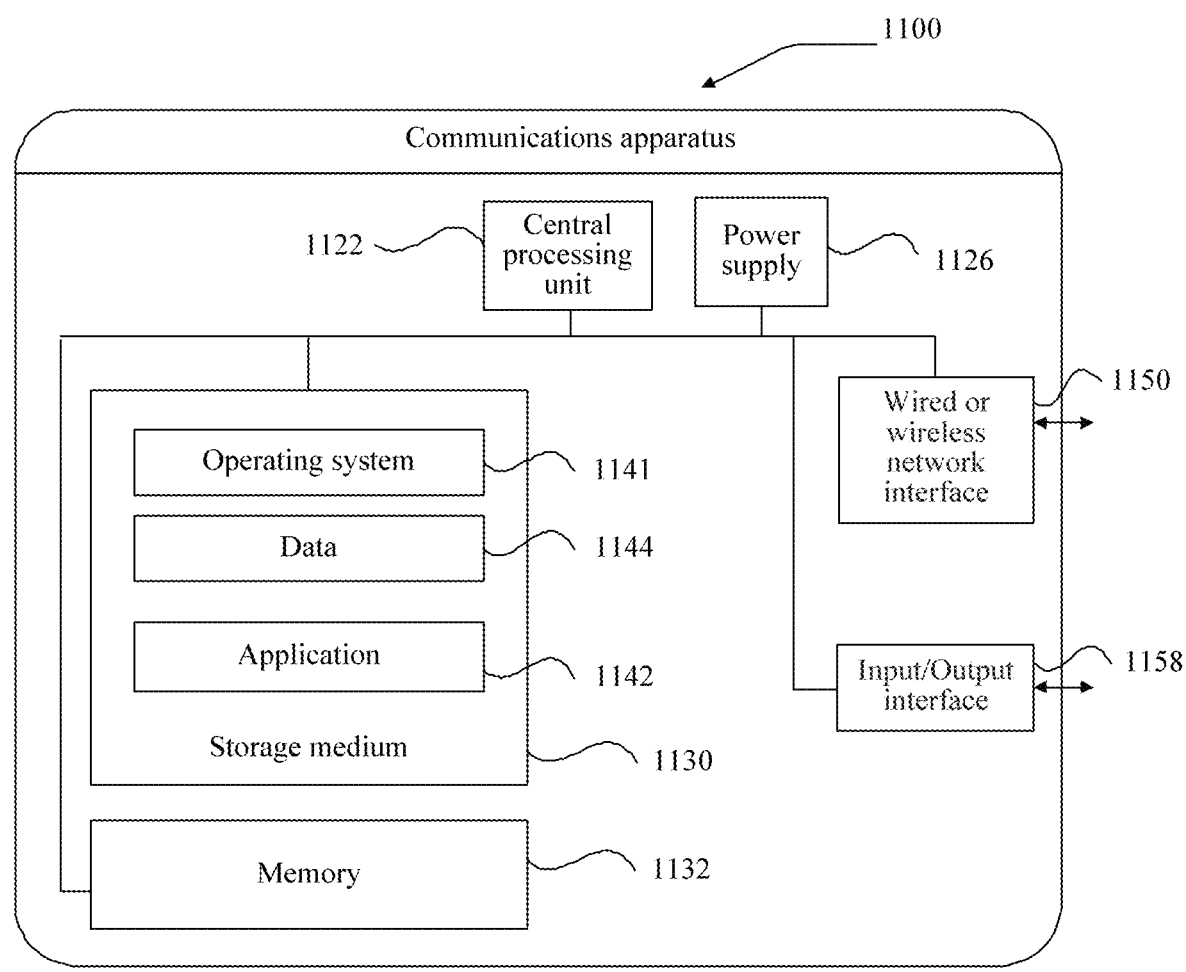
FIG. 11 is a schematic diagram of an embodiment of a communications apparatus according to at least an embodiment of this application.

FIG. 11 is a schematic structural diagram of a communications apparatus according to an embodiment of this application. The communications apparatus 1100 may have a relatively large difference due to different configuration or performance, and may include one or more central processing units (central processing units, CPU) 1122 (for example, one or more processors), a memory 1132, and one or more storage media 1130 (for example, one or more mass storage devices) that store an application program 1142 or data 1144. The memory 1132 and the storage medium 1130 may be used for temporary storage or permanent storage. The program stored in the storage medium 1130 may include one or more modules (not shown in the figure), and each module may include a series of instruction operations for the communications apparatus. Further, the central processing unit 1122 may be configured to communicate with the storage medium 1130, to perform, on the communications apparatus 1100, the series of instruction operations in the storage medium 1130.

The communications apparatus 1100 may further include one or more power supplies 1126, one or more wired or wireless network interfaces 1150, one or more input/output interfaces 1158, and/or one or more operating systems 1141 such as Windows Server™, Mac OS X™, Unix™, Linux™, and FreeBSD™.

The steps performed by the target master base station, the source master base station, and the user equipment in the foregoing embodiments may be based on the communications apparatus structure shown in FIG. 11.

In the specification, claims, and accompanying drawings of this application, the terms "first", "second", "third", "fourth", and so on (if existent) are intended to distinguish between similar objects but do not necessarily indicate a specific order or sequence. It should be understood that the data termed in such a way are interchangeable in proper circumstances, so that the embodiments described herein can be implemented in other orders than the order illustrated or described herein. In addition, the terms "include", "contain" and any other variants mean to cover the non-exclusive inclusion, for example, a process, method, system, product, or device that includes a series of steps or units is not necessarily limited to those steps or units, but may include other steps or units not expressly listed or inherent to such a process, method, system, product, or device.

What is claimed is:

1. A handover method, comprising:

receiving, by a target master base station, a handover request from a source master base station, wherein the handover request is useable to request handover of a user equipment from the source master base station to the target master base station;

sending, by the target master base station, a handover request acknowledgment message to the source master base station based on the handover request, wherein the handover request acknowledgment message indicates that the target master base station allows the user equipment to be handed over from the source master base station to the target master base station;

establishing, by the target master base station, a communication connection to the user equipment; and adding, by the target master base station, a secondary base station to a list of candidate base stations for communication with the user equipment, wherein the target master base station begins adding the secondary base station to the list after the target master base station establishes the communication connection to the user equipment.

2. The method according to claim 1, wherein the adding, by the target master base station, the secondary base station for the user equipment comprises:

sending, by the target master base station, an addition request to the secondary base station;

receiving, by the target master base station, addition acknowledgment information from the secondary base station, wherein the addition acknowledgment information indicates that the target master base station is allowed to add the secondary base station; and sending, by the target master base station, configuration information of the secondary base station to the user equipment thereby allowing the user equipment to access the secondary base station based on the configuration information.

3. The method according to claim 2, wherein the sending, by the target master base station, configuration information of the secondary base station to the user equipment comprises:

sending, by the target master base station, a radio resource control (RRC) connection reconfiguration message to the user equipment, wherein the RRC connection reconfiguration message comprises the configuration information of the secondary base station, and the RRC connection reconfiguration message instructs the user equipment to access the secondary base station based on the configuration information.

4. A handover method, comprising:

sending, by a source master base station, a handover request to a target master base station, wherein the handover request is useable to request handover of a user equipment from the source master base station to the target master base station;

receiving, by the source master base station, a handover request acknowledgment message from the target master base station, wherein the handover request acknowledgment message is sent before the target master base station adds a secondary base station to a list of candidate base stations for communication with the user equipment, and the handover request acknowledgment message indicates that the target master base station allows the user equipment to be handed over from the source master base station to the target master base station; and instructing, by the source master base station, handover of the user equipment to the target master base station, thereby causing the target master base station to establish a communication connection with the user equipment,
wherein the target master base station begins adding the secondary base station to the list after the target master base station establishes the communication connection with the user equipment.

5. The method according to claim 4, wherein the instructing, by the source master base station, handover of the user equipment to the target master base station comprises:
sending, by the source master base station, a radio resource control (RRC) connection reconfiguration message to the user equipment, wherein the RRC connection reconfiguration message comprises handover information of the handover of the user equipment from the source master base station to the target master base station, thereby causing the user equipment to be handed over from the source master base station to the target master base station based on the handover information.

6. The method according to claim 5, wherein after the instructing, by the source master base station, handover of the user equipment to the target master base station, the method further comprises:
sending, by the source master base station, a release request to the secondary base station, wherein the release request is useable to release a connection, related to the user equipment, between the source master base station and the secondary base station.

7. The method according to claim 4, wherein after the instructing, by the source master base station, handover of the user equipment to the target master base station, the method further comprises:
sending, by the source master base station, a release request to the secondary base station, wherein the release request is useable to release a connection, related to the user equipment, between the source master base station and the secondary base station.

8. A handover method, comprising:
receiving, by user equipment, notification information from a source master base station, wherein the notification information comprises handover information of handover of the user equipment from the source master base station to a target master base station, the notification information is sent after the source master base station receives a handover request acknowledgment message from the target master base station, the handover request acknowledgment message is sent before the target master base station adds a secondary base station to a list of candidate base stations for communication with the user equipment, and the handover request acknowledgment message indicates that the target master base station allows the user equipment to be handed over from the source master base station to the target master base station; and
establishing, by the target master base station, a communication connection with the user equipment based on the notification information,
wherein the target master base station begins adding the secondary base station to the list after the target master base station establishes the communication connection with the user equipment.

9. The method according to claim 8, wherein after the establishing, by the target master base station, the communication connection with the user equipment based on the notification information, the method further comprises:
receiving, by the user equipment, a first radio resource control (RRC) connection reconfiguration message from the target master base station, wherein the first RRC connection reconfiguration message comprises configuration information of the secondary base station; and
accessing, by the user equipment, the secondary base station based on the configuration information.

10. The method according to claim 9, wherein the establishing, by the target master base station, the communication connection with the user equipment based on the notification information comprises:
receiving, by the user equipment, a first radio resource control (RRC) connection reconfiguration message from the source master base station, wherein the first RRC connection reconfiguration message comprises the handover information; and
establishing, by the target master base station, the communication connection with the user equipment based on the handover information.

11. The method according to claim 8, wherein the establishing, by the target master base station, the communication connection with the user equipment based on the notification information, the method further comprises:
receiving, by the user equipment, a first radio resource control (RRC) connection reconfiguration message from the source master base station, wherein the first RRC connection reconfiguration message comprises the handover information; and
establishing, by the target master base station, the communication connection with the user equipment based on the handover information.

* * * * *